Figure 1:
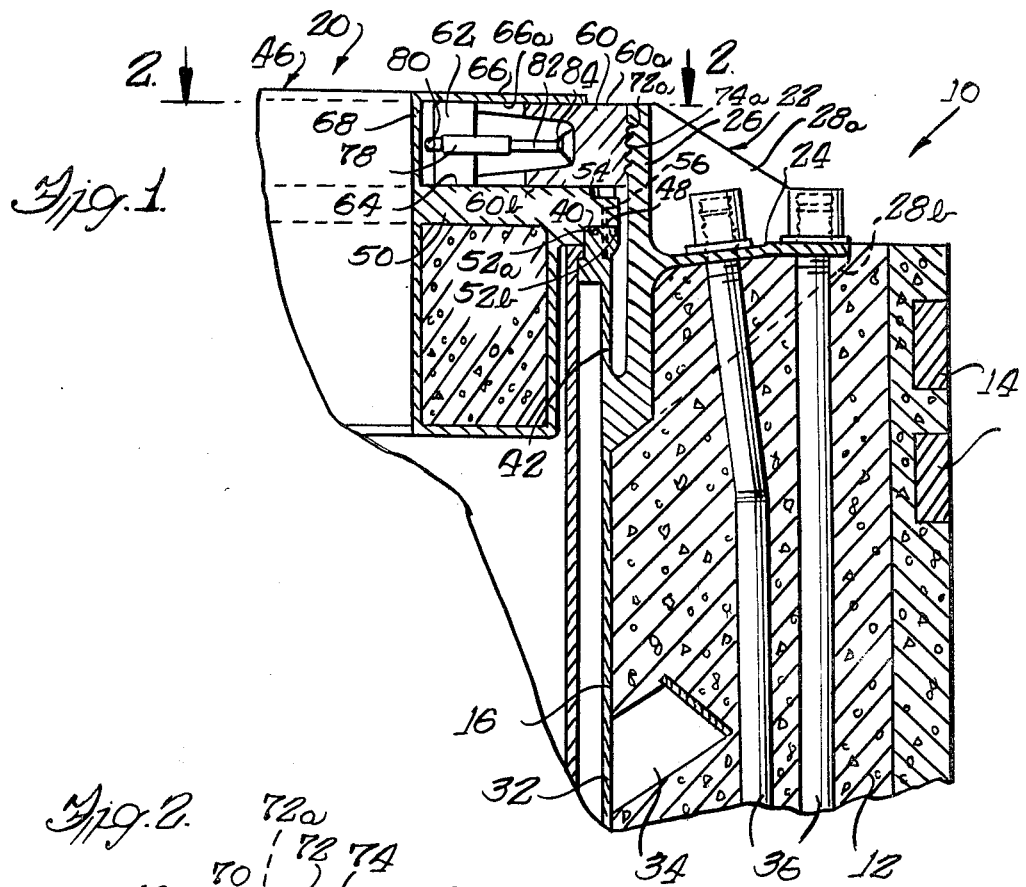

United States Patent [19]

Amtmann

[11] 4,303,177

[45] Dec. 1, 1981

[54] CAVITY CLOSURE ARRANGEMENT FOR HIGH PRESSURE VESSELS

[75] Inventor: Hans H. Amtmann, San Diego, Calif.

[73] Assignee: The United States of America as represented by the United States Department of Energy, Washington, D.C.

[21] Appl. No.: 17,418

[22] Filed: Mar. 5, 1979

[51] Int. Cl.² .......................................... B65D 85/46
[52] U.S. Cl. ............................. 220/323; 292/256.65
[58] Field of Search .......... 220/315, 3, 233, 234–238, 220/378, 323, 324; 292/6, 144, 256.63, 256.65, 256.67, 256.69, 257; 49/465

[56] References Cited

U.S. PATENT DOCUMENTS

| | | | |
|---|---|---|---|
| 3,568,379 | 3/1971 | Johnsson et al. | 220/378 X |
| 3,667,649 | 6/1972 | Thillet | 220/323 |
| 4,102,474 | 7/1978 | Platts | 220/323 |
| 4,140,240 | 2/1979 | Platts | 220/323 |

Primary Examiner—George T. Hall

[57] ABSTRACT

A closure arrangement for a pressure vessel such as the pressure vessel of a high temperature gas-cooled reactor wherein a liner is disposed within a cavity penetration in the reactor vessel and defines an access opening therein. A closure is adapted for sealing relation with an annular mounting flange formed on the penetration liner and has a plurality of radially movable locking blocks thereon having outer serrations adapted for releasable interlocking engagement with serrations formed internally of the upper end of the penetration liner so as to effect high strength closure hold-down. In one embodiment, ramping surfaces are formed on the locking block serrations to bias the closure into sealed relation with the mounting flange when the locking blocks are actuated to locking positions.

10 Claims, 3 Drawing Figures

U.S. Patent  Dec. 1, 1981  4,303,177

CAVITY CLOSURE ARRANGEMENT FOR HIGH PRESSURE VESSELS

The Government has rights in this invention pursuant to Contract No. DE-AT03-76SF71023, awarded by the U.S. Department of Energy.

The present invention relates generally to closure arrangements for use in high pressure vessels, and more specifically to a novel closure arrangement which finds particular application in closing a high pressure cavity in a nuclear reactor vessel.

To facilitate inspection and servicing of internal components of pressure vessels, such as gas-cooled nuclear reactor vessels, the internal components are housed within cavities within the pressure vessels which are conventionally closed by removable cavity closures. The closures are generally adapted for sealing relation with their associated pressure vessels and frequently include locking means adapted to secure the closure against internal cavity pressures.

In the case of large cavities requiring correspondingly large cavity closures which are subjected to relatively high cavity pressures, the design of the closure hold-down mechanism becomes increasingly critical because the force acting on the closure due to internal cavity pressure increases with the square of the diameter. In known closure arrangements for high pressure vessels, one manner of securing the closure to the reactor vessel is through a plurality of bolts disposed on an annular bolt circle. The circumference of the bolt circle increases linearly with the increase in diameter of the closure. Thus, with higher cavity pressures it becomes increasingly more difficult to accommodate the required number of bolts in a closure to provide sufficient hold-down strength against the internal cavity pressures.

As an alternative to securing closures to pressure vessel cavities by hold-down bolts or screws, arrangements have been devised which employ locking members supported by a pressure vessel adjacent an access opening for generally radial movement so as to cooperate with an associated closure to maintain the closure in locked relation with the pressure vessel, such as disclosed in U.S. Pat. Nos. 1,874,833 and 2,797,948. Alternatively, the locking members may be carried by the closure and operable to engage the associated pressure vessel such as disclosed in U.S. Pat. No. 2,196,895.

While the closure locking arrangements disclosed in the aforementioned United States patents have proven generally satisfactory for their intended uses, they exhibit a number of drawbacks which discourage their utilization in high pressure nuclear reactor systems. For example, in prestressed concrete nuclear reactor vessels, a liner is generally provided within a pressure cavity into which internal components are disposed. The liner defines a penetration at its upper end having a circumferential mounting ring on which the closure is mounted to effect sealed closing of the cavity. In the manufacture of prestressed concrete pressure vessels, the cavity access opening or penetration may not be a true circle in which case the liner and associated mounting ring may also not be circular. In such case, it is important that locking means be provided between the closure and the associated mounting ring to effect the desired locked and sealed closure attachment even though the cavity access opening may not be truly circular. Moreover, it is highly desirable from a safety standpoint that the locking pressures effected by the locking members carried on the closure with the mounting ring be substantially uniform about the full circumference of the mounting ring so as to prevent stress points which may lead to failure or other unsafe events. Additionally, the locking members carried by the closure are preferably adapted to effect a biased sealing relation between the closure and associated mounting ring as the locking members are moved into interlocking relation with the mounting ring.

One of the primary objects of the present invention is to provide a novel closure arrangement for closing a cavity in a pressure vessel wherein substantially uniform locking pressure engagement is effected between the closure and an associated mounting ring secured on the vessel, while simultaneously effecting a desired sealing relation of the closure to the mounting ring.

A more particular object of the present invention is to provide a novel closure arrangement for a nuclear reactor cavity wherein locking blocks are carried by a closure and are operable through discrete linear actuators to effect a desired locking relation with a mounting ring disposed circumferentially of a cavity penetration, the locking blocks having serrated surfaces thereon for interlocking relation with similarly configured serrated surfaces formed on the mounting ring so as to effect substantially uniform locking pressure about the circumference of the closure even though the closure or cavity liner may be slightly out-of-round.

In accordance with a preferred embodiment, the serrated surfaces on the locking blocks are adapted to effect increasing sealing pressure between the closure and the mounting ring as the locking blocks are progressively moved to their full locking positions with the mounting ring.

Figure 2:
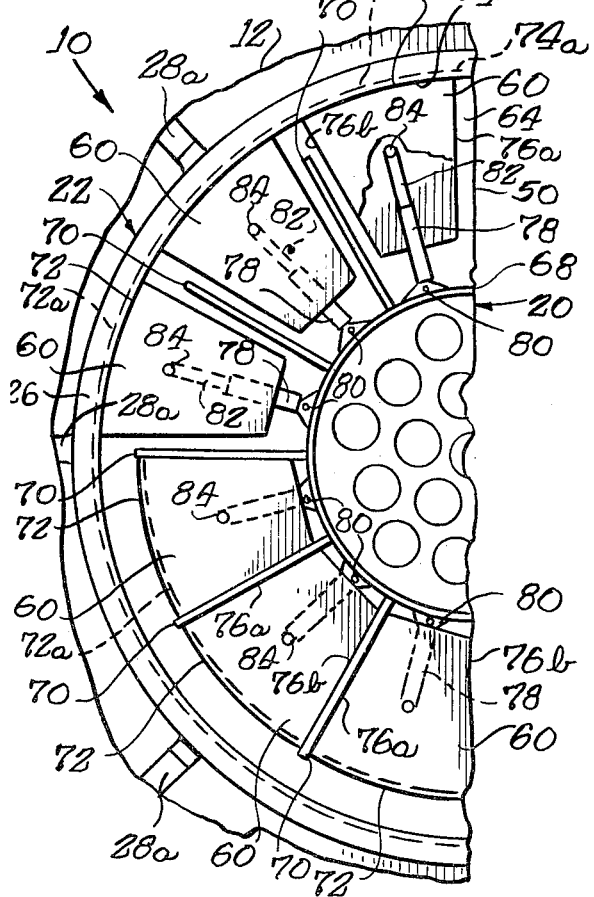
Figure 3:
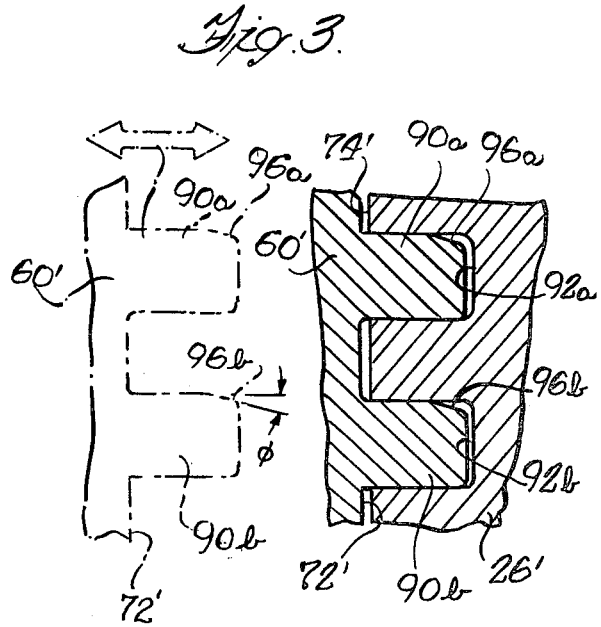

Further objects and advantages of the present invention, together with the organization and manner of operation thereof, will become apparent from the following detailed description of the invention when taken in conjunction with the accompanying drawing wherein like reference numerals designate like elements throughout the several views, and wherein:

FIG. 1 is a fragmentary vertical sectional view illustrating a portion of a pressure vessel having a pressure cavity and a closure in locking sealed relation with a cavity liner in accordance with the present invention;

FIG. 2 is a fragmentary transverse sectional view taken substantially along line 2—2 of FIG. 1 showing a plurality of the locking blocks carried on the closure, some of the locking blocks being shown in locking relation with the cavity liner and some of the locking blocks being shown in retracted positions; and FIG. 3 is an enlarged fragmentary view showing an alternative serrated locking surface formed on a closure block, the closure block being shown in solid lines in interlocking relation with the cavity liner, and being shown in phantom in a retracted unlocked condition.

Referring now to the drawing, a portion of a prestressed concrete pressure vessel having a closure arrangement in accordance with the present invention is indicated generally at 10. The prestressed concrete pressure vessel 10 may form a portion of a gas-cooled nuclear reactor pressure vessel of known design having a prestressed concrete wall 12 about which metallic reinforcing bands 14 are secured as is known. The pressure vessel wall 12 defines an internal pressure cavity or penetration 16 in which conventional internal components of the nuclear reactor may be located.

In accordance with the present invention, a closure arrangement, indicated generally at 20, is provided in cooperation with and forms a part of the pressure vessel 10. The closure arrangement 20 provides a removable closure for the cavity penetration 16 and is adapted to seal the upper access opening to the cavity 16 to prevent outward leakage of pressurized gases and the like from within the cavity.

The closure arrangement 20 includes annular mounting ring means 22 having an annular substantially horizontal flange 24 formed integral with and projecting radially outwardly from an annular ring or wall 26. The flange 24 constitutes a mounting flange and is reinforced by suitable vertically disposed webs 28a and 28b circumferentially spaced about the wall 26 and integral with or otherwise suitably secured to the flange 24 and annular wall 26.

The mounting ring means 22 is made of a suitable metallic material and is fixed to the upper end of an annular metallic penetration liner 32 disposed within the cavity 16. The liner 32 firmly engages the internal surface of the chamber 16 and is anchored within the concrete reactor vessel by a plurality of shear anchors 34 disposed about the liner and fixed to the outer surface thereof so as to project angularly upwardly into and be embedded within the concrete wall 12. A plurality of substantially vertical tendons 36 of known design pass through the flange 24 and the full height of the reactor vessel within the concrete wall 12 and secure the annular flange 24 to the upper end of the vessel wall 12.

The mounting ring means 22 defines an annular support and sealing surface 40 formed on the upper end of an annular wall 42 formed inwardly of and concentric with the annular liner wall 26 as best seen in FIG. 1. The support and sealing surface 40 preferably lies in a plane perpendicular to the axis of the annular liner 32 and serves to receive and support a closure 46 through an annular support surface 48 formed on the lower surface of an annular flange 50 of the closure so that the closure seats on the upper end of the annular wall 42. The support and sealing surface 40 has at least one, and preferably two, annular grooves formed circumferentially therein to receive suitable annular sealing rings 52a and 52b which are compressed by the mounting surface 48 on the flange 50. The flange 50 has an annular recessed surface 54 formed thereon through which a plurality of bolt mounting bores are formed in circumferentially spaced relation about the axis of the closure to receive mounting screws 56 having threaded engagement with suitable mating threaded bores in support surface 40 of the mounting ring means 22. As will become more apparent hereinbelow, the desired sealing pressure effected by the closure flange 50 against the sealing rings 52a, b and support surface 40 may be obtained by the screws 56 or by locking blocks carried on the closure 20 and adapted for releasable locking relation with the mounting ring means 22. In either case, the screws 56 and locking blocks cooperate to retain the closure in assembled relation on the pressure vessel against high internal cavity pressures.

In accordance with a feature of the present invention, the closure 46 has a plurality of locking blocks 60 supported thereon for movement between first radially inward positions facilitating mounting of the closure on the annular support surface 40 of the mounting ring means 22, and second radially outward positions effecting locking engagement with the mounting ring means to lock the closure in assembled relation on the pressure vessel 10. With particular reference to FIGS. 1 and 2, each of the locking blocks 60 is received within an outwardly opening recess 62 defined between an upper surface 64 on the flange 50 and the lower surface 66a of an annular radial wall 66 formed integral with or otherwise suitably secured to the flange 50 through an upstanding annular wall 68. Each of the locking blocks 60 has upper and lower parallel surfaces 60a and 60b which have sliding relation with the surfaces 66a and 64, respectively.

As best illustrated in FIG. 2, the locking blocks 60 are generally trapezoidal shaped in plan configuration and each locking block is radially movable within a corresponding discrete recess 62 in the closure 46, the lateral edges of each recess being defined by radial upstanding partition walls 70 disposed in equidistantly circumferentially spaced relation about the axis of upstanding annular wall 68. Each locking block 60 has an outer arcuate or radial surface 72 having a radius substantially equal to the radius of an inner circular surface 74 formed on the annular wall 26 of the mounting ring means. Each locking block 60 also has lateral edge surfaces 76a and 76b which are substantially parallel to the corresponding partition walls 70 defining the associated recess 62.

To effect radial movement of the locking blocks 60, each locking block has a linear actuator 78 operatively associated therewith. The linear actuators 78 comprise fluid operated cylinders, preferably hydraulic, each of which is pivotally connected at 80 to the upstanding annular wall 68 and has an extendible piston 82 the outer end of which is pivotally connected to the associated locking block as at 84. Each of the fluid actuators 78, which may be double acting cylinders or single acting with inwardly biased pistons, is connected to a suitable source of fluid pressure through separate and distinct pressure flow lines (not shown) so as to enable independent actuation of the actuators to extend or retract the associated locking blocks relative to the axis of the closure 46. The pressure flow lines may be connected to a common fluid control valve of conventional design which facilitates independent or joint movement of the actuators in accordance with known techniques.

In accordance with another feature of the present invention, the outer arcuate surface 72 on each of the locking blocks is serrated at 72a to define a plurality of substantially V-shaped, parallel, horizontal grooves or serrations which are adapted for interlocking engagement with a similarly serrated annular surface 74a formed on the opposed inner circular surface 74 on the mounting ring means 22. The outwardly and downwardly inclined surfaces of the serrations 72a on the locking blocks serve as ramp surfaces which engage corresponding inwardly and downwardly inclined surfaces of the annular serrated surface 74a so as to urge the locking blocks and associated closure flange 50 downwardly toward the annular support surface 40 on the mounting ring means when the locking blocks are moved to their locking positions.

In assembling the closure 46 onto the mounting ring means 22 to close and seal the upper end of the cavity penetration 16, the locking blocks 60 are moved to their radially inward positions within their corresponding recesses 62 and the closure is placed in supporting relation on the annular support surface 40 of the mounting ring wall 42. Mounting screws 56 are then inserted through the flange 50 for threaded connection to the annular wall 42 of the mounting ring means 22. The fluid actuators 78 are then actuated to extend the pistons 82 and effect a corresponding outward movement of the locking blocks to interengage the serrated surfaces 72a thereon with the opposing serrated surface 74a on the mounting ring 74.

By moving the locking blocks 60 outwardly through individual independently operated actuators 78, the desired interlocking engagement of the locking blocks and the opposed serrated surface 74a on the mounting ring wall 26 may be effected irrespective of whether the internal opening defined by the annular wall 26 is a true circle or is slightly out-of-round. This is particularly important for application with prestressed concrete pressure vessels 10 which are relatively massive and where the cavity penetration 16 and its associated mounting ring means may deviate slightly from a true circular or cylindrical opening due to the longitudinal and circumferential prestressing and manufacturing and assembly tolerances.

FIG. 3 illustrates an alternative and preferred embodiment wherein each of the locking blocks, one of which is indicated by reference numeral 60', has a plurality, such as two, of horizontal radial projections 90a and 90b formed on its outer arcuate surface 72' such that the projections lie in substantially parallel planes transverse to the axis of the closure. In the embodiment of FIG. 3, the projections 90a, b are substantially rectangular in transverse cross-sectional configuration and similar shaped annular grooves 92a and 92b are formed in the inner annular surface 74' of the annular wall 26' so as to extend about the full inner surface 74' circumferentially of the sealing ring means 22'. The grooves 92a, b are positioned to receive the projections 90a and 90b on the locking blocks 60' when the closure 46' mounted on the associated pressure vessel and the locking blocks are moved to their radially outward locking positions.

In accordance with the embodiment of FIG. 3, the arcuate locking projections 90a, b are formed with downwardly inclined ramp or cam surfaces 96a and 96b, respectively, which are inclined at an angle represented by the symbol phi ($\phi$). The ramp surfaces 96a, b are adapted to facilitate entry of the locking projections 90a, b within the grooves 92a, b and effect a downward biasing or camming movement locking blocks 60' and associated flange 50 (FIG. 1) of the closure against the underlying annular support surface 40 so that the flange 50 deforms the annular sealing rings 52a, b. The ramp angle phi ($\phi$) preferably comprises an angle in the range of 5–15 degrees. The ramp or cam surfaces 96a, b serve to facilitate interlocking engagement of the projections 90a, b within the grooves 92a, b in case of slight vertical differences between the projections and grooves, and also provide the desired sealing pressure against internal pressure during operating conditions. The mounting screws 56 supply the desired seating load for the gasket seals 50a, b and also assist in maintaining the closure against the internal cavity pressures.

Thus, in accordance with the present invention, a novel closure arrangement for use with a pressure vessel, and particularly a prestressed concrete pressure vessel, is provided wherein a desired sealed closing of an access opening in a cavity penetration is effected and a positive locking relation of the closure to the pressure vessel is obtained even though the access opening and associated mounting ring circumferentially of the access opening may not be truly circular. The provision of a plurality of discrete locking blocks carried circumferentially about the axis of the closure for radial movement into interlocking relation with an associated annular mounting ring effects a positive locking relation of the closure to the pressure vessel, with the pressure stresses acting on the closure thereby being substantially uniform about the full circumference of the mounting ring. By such a mounting arrangement, stress concentration points at one or more locations circumferentially of the mounting ring are eliminated and a safer closure system for the high pressure reactor vessel is accomplished.

While preferred embodiments of the invention have been illustrated and described, it will be understood to those skilled in the art that changes and modifications may be made therein without departing from the invention in its broader aspects.

Various features of the invention are defined in the following claims.

What is claimed is:

1. In a pressure vessel having at least one pressure cavity therein defining an access opening, the combination therewith comprising, mounting ring means fixedly secured to said vessel circumferentially of said access opening, said mounting ring means defining a support surface extending substantially circumferentially of said opening, a closure adapted for cooperation with said mounting ring means so as to be supported by said support surface in a manner to close said access opening, said mounting ring means defining at least one internal locking groove therein, a plurality of locking blocks carried by said closure for pure radial movement between first positions spaced from said mounting ring means when said closure is mounted on said support surface and second positions cooperating with said locking groove, each of said locking blocks having at least one locking projection thereon adapted for releasable interengagement with said locking groove in said mounting ring means when said locking blocks are moved radially to said second positions, and discrete actuator means cooperative with each of said locking blocks and operative to effect radial movement thereof between said first and second positions, said locking projections on said locking blocks having ramp surfaces thereon operative to effect biased movement of said closure toward said support surface so as to increase the sealing relation therebetween as said locking blocks are moved to their said second positions.

2. The combination as defined in claim 1 wherein said support surface defines a continuous surface circumferentially of said mounting ring means, and including at least one continuous seal between said support surface and said closure and adapted to be compressed into sealing relation with said closure during movement of said locking blocks to their said second positions.

3. The combination as defined in claim 1 wherein said internal locking groove extends the full circumference of said mounting ring means, each of said locking blocks being adapted for cooperation with a portion of the said circumferential locking groove formed in said mounting ring means whereby substantially uniform locking relation may be obtained between said locking blocks and said mounting ring means.

4. The combination as defined in claim 1 wherein said discrete actuator means comprises a linear fluid pressure operated actuator operatively associated with each of said locking blocks and operative to effect movement thereof between its said first and second positions.

5. The combination as defined in claim 1 wherein said mounting ring means is adapted to be partially received within said pressure cavity and extends the full circumference of said access opening so as to define a continuous annular support surface disposed internally of said mounting ring and adapted to receive said closure thereon in supporting relation therewith.

6. The combination as defined in claim 5 wherein said closure has a generally circular plan configuration, said locking blocks being supported on said closure for radial sliding relation thereon between their said first and second positions, each of said locking blocks having at least two radial locking projections formed thereon adapted for cooperating relation with similarly configured annular grooves formed internally of said mounting ring means, said locking projections and annular grooves being adapted to effect increasing pressure reaction between said closure and said annular support surface as said locking blocks are moved to their said second positions wherein said projections are received within said annular grooves in said mounting ring means.

7. The combination as defined in claim 6 wherein said projections have downwardly inclined ramp surfaces thereon adapted for engagement with said annular grooves in said mounting ring means in a manner to effect downward camming movement of said closure as said locking blocks are moved to their said second positions.

8. The combination as defined in claim 5 including at least one annular seal adapted for cooperation with said annular support surface so as to be compressed by said closure as said locking blocks are moved to their said second positions.

9. The combination as defined in claim 1 wherein said closure defines a plurality of substantially equal size radial recesses, and including one of said locking blocks slidable within each of said recesses.

10. The combination as defined in claim 9 wherein said radial recesses are laterally defined by circumferentially spaced radial walls, each of said locking blocks being generally frustoconical in plan configuration and having an outer radial surface on which at least one said locking projection is formed.

* * * * *